US010283966B2

(12) United States Patent
Macdonald

(10) Patent No.: US 10,283,966 B2
(45) Date of Patent: May 7, 2019

(54) SYSTEM AND METHODS FOR POWER GENERATION

(71) Applicant: Bluvert Technologies Ltd., Surrey (CA)

(72) Inventor: Don Macdonald, Surrey (CA)

(73) Assignee: Bluvert Technologies Ltd., Surrey (CA)

( * ) Notice: Subject to any disclaimer, the term of this patent is extended or adjusted under 35 U.S.C. 154(b) by 296 days.

(21) Appl. No.: 15/225,801

(22) Filed: Aug. 1, 2016

(65) Prior Publication Data

US 2017/0133852 A1 May 11, 2017

Related U.S. Application Data

(60) Provisional application No. 62/199,958, filed on Jul. 31, 2015.

(51) Int. Cl.
*H02J 3/38* (2006.01)
*H02J 7/34* (2006.01)
(Continued)

(52) U.S. Cl.
CPC ............... *H02J 3/382* (2013.01); *H02J 3/38* (2013.01); *H02J 5/00* (2013.01); *H02J 7/34* (2013.01);
(Continued)

(58) Field of Classification Search
CPC .... H02J 3/383; H02J 3/32; H02J 3/386; H02J 3/28; H02J 3/382; H02J 1/10; H02J 3/008; H02J 7/007; H02J 7/35
(Continued)

(56) References Cited

U.S. PATENT DOCUMENTS 6,175,217 B1 1/2001 Da Ponte et al.
6,351,692 B1 2/2002 Eaton et al.
(Continued)

FOREIGN PATENT DOCUMENTS

WO 2004038892 A2 5/2004
WO 2009073125 A1 6/2009
(Continued)

OTHER PUBLICATIONS

Leuchter et al., "Dynamic Behavior of Mobile Generator Set with Variable Speed and Diesel Engine", Power Electronics Specialists Conference, 2007, pp. 1-7.
(Continued)

*Primary Examiner* — John W Poos
(74) *Attorney, Agent, or Firm* — Corridor Law Group, P.C.

(57) ABSTRACT

A power generation system can include a variable speed generation module with a variable speed generator coupled to an AC-DC converter, a power module, an energy management system coupled to the variable speed generation module and the power module, a fixed speed generator, a DC bus wherein the variable speed generation module is coupled to a DC bus via the AC-DC converter, and the power module is coupled to the DC bus via the DC-DC converter and via the DC-AC converter, and an AC bus wherein the fixed speed generator is coupled to the AC bus via a breaker and the AC bus is coupled to the DC bus via the DC-AC converter of the power module wherein the energy management system adjusts the electrical power output of the variable speed generator, the fixed speed generator, and the energy storage unit.

20 Claims, 9 Drawing Sheets

(51) Int. Cl.
*H02K 7/18* (2006.01)
*H02J 5/00* (2016.01)
(52) U.S. Cl.
CPC ............ *H02K 7/1815* (2013.01); *H02J 3/383* (2013.01); *H02J 3/386* (2013.01); *H02J 3/387* (2013.01); *H02J 2003/388* (2013.01)
(58) Field of Classification Search
USPC .......................................................... 307/26
See application file for complete search history.

(56) References Cited

U.S. PATENT DOCUMENTS

| | | |
|---|---|---|
| 6,879,053 B1 | 4/2005 | Welches et al. |
| 8,022,572 B2 | 9/2011 | Vyas et al. |
| 8,053,917 B2 | 11/2011 | Inakasa et al. |
| 8,829,698 B2 | 9/2014 | Koeneman et al. |
| 8,946,915 B2 | 2/2015 | Yu et al. |
| 2004/0084965 A1 | 5/2004 | Welches et al. |
| 2008/0203734 A1 | 8/2008 | Grimes et al. |
| 2008/0303349 A1 | 12/2008 | Gallegos-Lopez et al. |
| 2009/0140576 A1 | 6/2009 | Yu et al. |
| 2009/0195074 A1 | 8/2009 | Buiel |
| 2009/0312885 A1 | 12/2009 | Buiel |
| 2010/0148518 A1 | 6/2010 | Algrain |
| 2012/0267957 A1* | 10/2012 | Czarnecki ................ H02J 3/02 307/64 |
| 2014/0015257 A1 | 1/2014 | Dobbs |
| 2014/0152007 A1 | 6/2014 | Sterregaard et al. |
| 2014/0265353 A1 | 9/2014 | Yu et al. |
| 2014/0306537 A1 | 10/2014 | Nayar |
| 2014/0361549 A1 | 12/2014 | Cristofaro |

FOREIGN PATENT DOCUMENTS

| | | |
|---|---|---|
| WO | 2012135258 A2 | 10/2012 |
| WO | 2013026082 A1 | 2/2013 |

OTHER PUBLICATIONS

Mueller, C., "Improving Energy Efficiency with CHP: How to Evaluate Potential Cost Savings", MTU Onsite Energy Technical Articles, 2013, pp. 1-5.
Shibutani, J., "Generator for Future Power Plants", PG Generators. Innovus Power: Case Studies URL: http://www.innovus-power.com/case-studies/.
Nayar, C., "High Renewable Energy Penetration Diesel Generator Systems", Electrical India vol. 50, No. 6 (2010), pp. 54-64.
Sebastian et al., "Study and Simulation of a Battery Based Energy Storage System for Wind Diesel Hybrid Systems", Energy Conference and Exhibition, Sep. 9-12, 2012.
Andriulli et al., "Advanced Power Generation Systems for the 21st Century: Market Survey and Recommendations for a Design Philosophy", Oak Ridge National Laboratory, 1999, pp. 1-237.
Nayar, C., "High Renewable Energy Penetration Diesel Generator Systems", published by InTech in "Paths to Sustainable Energy", ISBN: 978-953-307-401-6, Nov. 2010, pp. 511-536.
"BlueDrive PlusC", published by Siemens of Norway.
Preston, M., "White Paper on Variable Speed Gensets", Innovus Power, Apr. 2013, pp. 1-11.
Brown, D., "Variable Speed Gensets", published by CVT Corp.

\* cited by examiner

SYSTEM AND METHODS FOR POWER GENERATION

CROSS-REFERENCE TO RELATED APPLICATIONS

This application claim priority benefits from U.S. provisional patent application No. 62/199,958 filed on Jul. 31, 2015 entitled "System and Methods for Power Generation". The '958 application is incorporated by reference herein in its entirety.

FIELD OF THE INVENTION

The present technique relates generally to systems and methods for power generation, and more specifically, to power generation systems with variable power generation and energy storage.

SUMMARY OF THE INVENTION

A power generation system can include a variable speed generation module with a variable speed generator coupled to an AC-DC converter; a power module (wherein the power module includes an energy storage unit coupled to a DC-DC converter and a DC-AC converter); an energy management system coupled to the variable speed generation module and the power module; a fixed speed generator; a DC bus wherein the variable speed generation module is coupled to the DC bus via the AC-DC converter, and the power module is coupled to the DC bus via the DC-DC converter and via the DC-AC converter; and an AC bus wherein the fixed speed generator is coupled to the AC bus via a breaker, and the AC bus is coupled to the DC bus via the DC-AC converter of the power module. In some embodiments, the energy management system adjusts the electrical power output of the variable speed generator, the fixed speed generator, and the energy storage unit.

In some embodiments, the power generation system supplies DC power to at least one of a fixed DC load, a variable DC load, a motor, and/or the DC-AC converter. In other or the same embodiments, the power generation system supplies AC power to an AC load directly from the AC bus or from the DC bus via the DC-AC converter.

In certain embodiments, the energy management system load-shares among the variable speed generator, the fixed speed generator, and the energy storage unit.

A power generation system can also include a renewable energy source coupled to the DC bus. The renewable energy source can include a solar energy source, a wind turbine; and/or a water turbine. A power generation system can also include an alternative energy source coupled to the DC bus. The alternative energy source can include a fuel cell; and/or an exhaust gas-driven turbine-generator.

The power generation system can also include an interface to a utility grid, wherein the interface is coupled to the AC bus.

In some embodiments, the energy storage unit includes at least one of a capacitor, an ultra-capacitor, and/or a battery. In certain embodiments, the variable speed generator is a permanent magnet generator.

In at least some embodiments, the energy management system operates the power generation system in island mode. In other, or the same embodiments, the energy management system operates the power generation system in micro-grid mode.

In some embodiments, the power generation system charges the energy storage unit.

A method for operating a power generation system to generate electrical power can include: adjusting a speed of the variable speed generator to increase the fuel efficiency of the power generation system; adjusting the electrical power supplied by the energy storage unit in response to detecting a step load change; receiving a speed error from the variable speed generator, the speed error based at least in part on a difference between a commanded speed and a speed feedback value; filtering the speed error to generate a filtered speed error; receiving a DC bus voltage error based at least in part on a difference between a nominal DC bus voltage and a received DC bus voltage; selecting a control parameter based at least in part on the lower of the filtered speed error and the DC bus voltage error; receiving a variable speed generator error based at least in part on a difference between a desired variable speed generator load and a received load; combining the control parameter and the variable speed generator error to generate a current reference; discharging the energy storage unit of the power module based at least in part on the current reference; and/or charging the energy storage unit after the discharging the energy storage unit.

Adjusting the electrical power supplied by the energy storage unit can include monitoring a speed for the variable speed generator; monitoring a load on at least one of an AC bus and a DC bus; and/or governing the rate at which power is drawn from the energy storage unit based at least in part on the load.

Charging the energy unit can include: determining an available power for charging based at least in part on a difference between a preferred load capacity at the present speed of the variable speed generator and a received load; transforming the available power for charging into a current reference limit; receiving a nominal source voltage error based at least in part on a difference between a desired voltage for the energy storage unit and a received voltage; generating a current reference based at least in part on the nominal source voltage error and the current reference limit; and charging the energy storage unit of the power module based at least in part on the current reference.

In some embodiments, filtering the speed error to generate a filtered speed error includes filtering the speed error using a Savitzky-Golay filter.

DEFINITION OF TERMS

Figure 1:
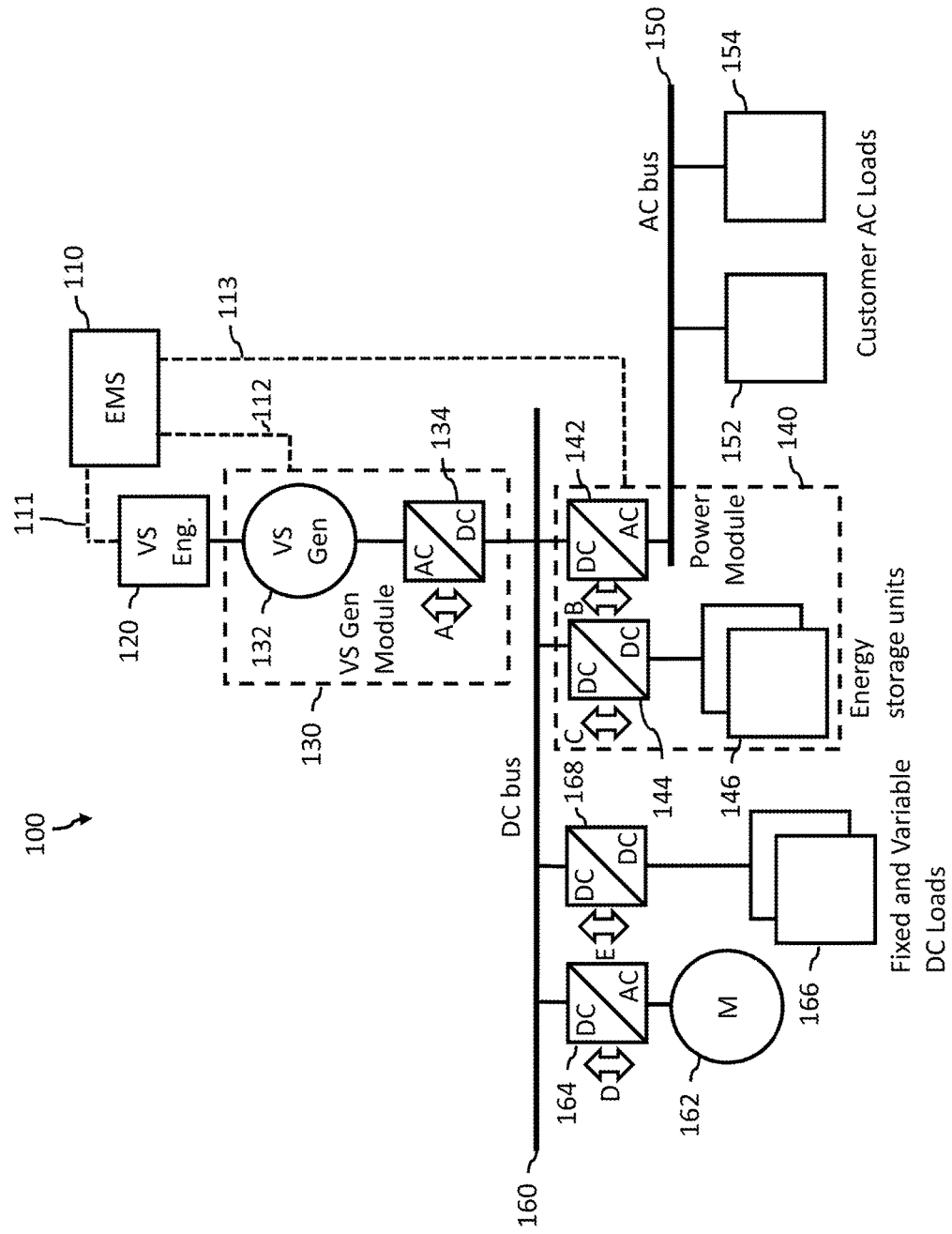
FIG. 1 is a block diagram of a power generation system according to a first illustrated embodiment.

AFE (Active Front End): actively converts between AC and DC power and can provide output voltage regulation and AC input harmonic reduction. An AFE is also referred to as an active rectifier.

BSFC (Brake Specific Fuel Consumption): a measure of fuel efficiency for a prime mover that burns fuel and produces rotational power.

EMS (Energy Management System): a system of tools to monitor, control and improve the performance of a power generation system.

Fieldbus: a family of network protocols for real-time distributed control (standardized as IEC 61158).

Genset: a combination of an electric generator and an engine.

Inverter: A DC-AC converter. For example, a device that converts direct current into alternating current. If the device is bidirectional, then it can also act as a rectifier and can convert alternating current into direct current.

Island Mode: Mode in which the variable speed generation module operates standalone with no fixed speed generators online.

J1939 communication interface: J1939 is a set of standards defined by the Society of Automotive Engineers (SAE), and the J1939 communication interface is a bus for communication and diagnostics that is typically used in vehicles.

Micro-Grid Mode: Mode in which the power generation system operates both variable speed and fixed speed generators at preferred loading points, generally to achieve improved fuel efficiency and reduced wear and tear on the engines. The mode also can reduce the number of fixed speed generators required to meet a given system capacity.

Peak Shaving: Reducing the amount of energy purchased from a utility during peak hours when the costs are higher than at another time.

PID (Proportional Integral Derivative) Controller: A control loop feedback mechanism that calculates and attempts to minimize, or at least reduce a difference between a measured value and a desired setpoint.

PMG (Permanent Magnet Generator): A generator where at least one permanent magnet provides the magnetic field of the rotor.

Savitzky-Golay filter: A digital filter, applied to a set of digital data for the purpose of smoothing the data, that fits successive sub-sets of adjacent data points with a low-degree polynomial using the method of linear least squares.

THD (Total Harmonic Distortion): The ratio of the sum of the powers of all harmonic components to the power of the fundamental frequency. THD is a measure of the power quality of electric power systems.

Variable Speed Generator: A generator that can run at a variable speed, generally as required to meet a given load.

DETAILED DESCRIPTION OF PREFERRED EMBODIMENT(S)

Power generation systems can be used to provide electrical power, including AC and DC power, for off-grid applications at remote sites. In some examples the power generation systems provide power for drilling and pumping operations at oil wells. A hybrid system comprising one or more engine-driven generators and energy storage, such as one or more battery banks, capacitor banks, or other suitable energy storage media, can be used to provide a reliable source of energy. Renewable energy sources, and/or other energy sources such as fuel cells, can also be used in the hybrid system as an alternative and/or secondary power source.

A variable speed generator can be driven by an engine operating at an engine speed selected to meet the power demands of the load. Advantages of controlling engine speed to meet the load requirement can include improved performance, longer engine life, reduced fuel consumption, lower emissions, and reduced noise compared to a fixed speed generator.

A power generation system can be operated using an energy management system comprising technology for monitoring, controlling, improving, and/or optimizing system performance.

A hybrid variable speed/fixed speed power generation system with energy storage and energy management and corresponding methods for controlling hybrid power generation is described below.

Benefits of the hybrid variable speed/fixed speed power generation system with energy storage and energy management and corresponding methods for controlling hybrid power generation include reduced fuel consumption and lower emissions, achieved by increasing efficiency and reducing the reliance on fixed speed diesel generators.

In at least one embodiment, the system comprises one or more variable speed generators and one or more fixed speed generators. The variable speed and fixed speed generators can be part of variable speed gensets and fixed speed gensets, respectively.

The variable speed gensets can each include a power source configured to operate at a variable rotor speed to provide responsive power to a load. The energy storage can be configured to store excess power and discharge power, as desired.

At least some variable speed generators can provide power to a common DC bus via an AC-DC converter. At least some fixed speed generators can provide power to the AC Bus. An energy storage unit is connected to the common DC bus via a DC-DC converter. A motor can be connected to the common DC bus via an AC-DC converter. An alternative power source, such as a fuel cell or an exhaust gas-driven turbine-generator, can also be connected to the DC bus via a DC-DC converter or an AC-DC converter, as appropriate. A renewable power source, such as a wind turbine, can also be connected to the common DC bus via an AC-DC converter or a DC-DC converter. In some embodiments, other types of power sources in addition to those specifically named can be connected to the common DC bus via an AC-DC converter or a DC-DC converter. Similarly, in other or the same embodiments, other types of power sources in addition to those specifically named can be connected to an AC bus.

The hybrid power generation system comprises a controller, known as an energy management system, communicatively coupled to the variable speed and fixed speed gensets, and the energy storage. The energy management system can improve, or optimize, system efficiency for different load profiles. In some embodiments, this is accomplished, at least in part, by utilizing the wide operating range of the variable speed generator to keep the fixed speed generator operating at a preferred, or optimal, load point.

The generators can be controlled to allow the energy storage unit to charge when there is excess power available.

The energy management system can adjust the power provided by the variable speed generator to meet the load requirements, and can start up/shut down the fixed speed generator. The energy management system can also control the use of the energy storage as a temporary source of power when the fixed speed generator is starting up.

FIG. 1 is a block diagram of power generation system 100, according to a first illustrated embodiment.

Power generation system 100 comprises energy management system 110, variable speed engine 120, variable speed generation module 130, and power module 140.

Energy management system (EMS) 110 controls variable speed engine 120, variable speed generation module 130, and power module 140 via interfaces 111, 112, and 113, respectively. In at least one embodiment, EMS 110 controls variable speed engine 120 via a J1939 communication interface, and controls variable speed generator module 130 and power module 140 via a Fieldbus interface.

Variable speed engine 120 is operatively connected to variable speed generation module 130. In at least one embodiment, variable speed engine 120 is a diesel engine.

Variable speed generation module 130 comprises variable speed generator 132 and inverter 134.

In at least one embodiment, variable speed generator 132 is a permanent magnet generator (PMG). In other embodiments, variable speed generator 132 can be other suitable generators. In at least one embodiment, inverter 134 is replaced by an active front end (AFE). Inverter 134 can be beneficial when variable speed generator 132 is a PMG or an induction generator. An AFE can be beneficial when variable speed generator 132 is a self-excited synchronous generator.

Power generation system 100 further comprises DC bus 160. Inverter 134 comprises an AC-DC converter. Inverter 134 converts variable voltage, variable frequency input to a fixed voltage DC for output to DC bus 160. In at least one embodiment, DC bus is in the range of 900 V to 1,000 V, for example 911 V. As indicated by arrow A, energy can flow in both directions between AFE 134 and DC bus 160.

Power generation system 100 provides DC power to motor 162 via DC bus 160 and DC-AC converter 164. In some embodiments, motor 162 can be a fan. Motor 162 can be one of the primary loads on a drilling rig. Power generation system 100 provides DC power to fixed and variable DC loads via DC bus 160 and DC-DC converter 168.

Power module 140 comprises DC-AC converter 142, DC-DC converter 144 and energy storage units 146. In some embodiments, energy storage units 146 comprise at least one storage capacitor. In other embodiments, energy storage units 146 can comprise at least one of ultra-capacitors and/or batteries. In yet other embodiments, energy storage units 146 can comprise a motor/generator and flywheel combination and/or a motor/generator and compressed air combination, operatively connectable to DC bus 160 via a DC-AC inverter (not shown in FIG. 1).

As indicated by arrow C, energy can flow in both directions between DC bus 160 and energy storage units 146 via DC-DC converter 144. DC-DC converter 144 charges and discharges energy storage units 146.

EMS 110 controls power module 140 to supply energy to DC bus 160 via DC-DC converter 144. Under the control of EMS 110, system 100 can supply power to energy storage units 146 from at least one of variable speed generator 132 and AC bus 150.

Power generation system 100 further comprises AC bus 150 and customer AC loads, such as loads 152 and 154. As indicated by arrow B, energy can flow in both directions between DC bus 160 and AC bus 150 via DC-AC converter 142. In at least one mode of operation, DC-AC converter 142 provides AC power to AC bus 150. DC-AC converter 142 can provide fixed voltage, fixed frequency AC. In some embodiments, DC-AC converter 142 can provide 600 V, 60 Hz, power to AC bus 150 with less than 5% THD. In some embodiments, example implementation, DC-AC converter 142 can provide power to AC bus 150 with 5% THD or greater.

Power generation system 100 operates in island mode. EMS 110 controls system 100 by controlling variable speed engine 120, variable speed generation module 130 and power module 140.

EMS 110 can monitor and manage customer AC loads 152 and 154, if desired. EMS 110 can also monitor and manage motor 162 and customer DC loads 166, if desired.

Power module 140 of FIG. 1 is shown in conjunction with variable speed generation module 130 as part of system 100. In other embodiments, power module 140 can operate as a standalone unit without being operatively connected to variable speed generation module 130.

Power module 140 can supply large amounts of power in a short time to support DC bus 160, which in turn supports AC bus 150. Power module 140 can provide the equivalent of a rotating reserve to DC bus 160, even if variable speed generator 132 is off-line.

Figure 2:
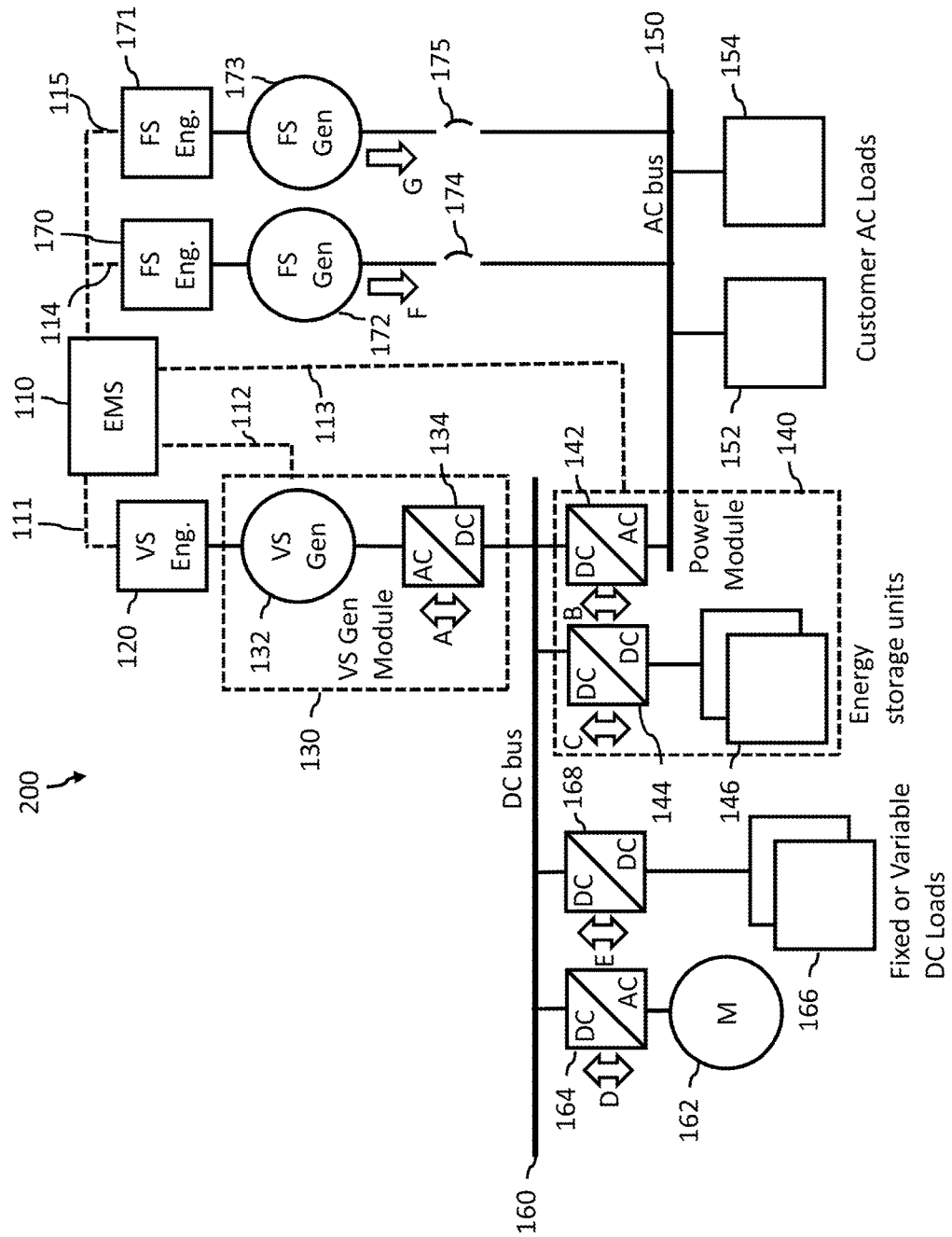
FIG. 2 is a block diagram of a power generation system according to a second illustrated embodiment.

FIG. 2 is a block diagram of power generation system 200, according to a second illustrated embodiment.

Power generation system 200 comprises the elements of power generation 100. Power generation system 200 further comprises at least one fixed speed engine such as fixed speed engines 170 and 171. Fixed speed engines 170 and 171 are operatively connected to fixed speed generators 172 and 173, respectively. Fixed speed generators 172 and 173 provide power to AC bus 150 via breakers 174 and 175, respectively.

EMS 110 controls fixed speed engines 170 and 171 via interfaces 114 and 115, respectively. EMS 110 controls fixed speed generators 172 and 173, for example by start and stop commands. Loading of fixed speed generators 172 and 173 can be accomplished by monitoring the load on AC bus 150, and adding to AC bus 150, or subtracting from AC bus 150, power supplied by variable speed generator module 130 via power module 140. In this way, system 200 maintains a preferred, or optimal, load efficiency for most, if not all, connected generators.

EMS 110 can switch power generation system 200 between island mode and micro-grid mode, according to system operation. In micro-grid mode, EMS 110 can blend operation of variable speed and fixed speed generators, generally to provide improved or optimal loading of the fixed speed generators.

System 200 can control the load on the fixed speed generators by the degree to which it augments power on AC bus 150 using variable speed generator 132 and/or the energy storage units 146.

In one example power generation system 200 has a total customer load of 2 MW. Variable speed generator 132 has a capacity of 1 MW. Fixed speed generators 172 and 173 also each have a capacity of 1 MW, and a preferred, or optimal, load of 850 kW. Operating each fixed speed generator at its optimal load of 850 kW would require variable speed generator 132 to provide the balance of 300 kW.

EMS 110 adjusts the loading of the variable and fixed speed generators to reduce brake specific fuel consumption (BSFC). In some embodiments, it can be more efficient to operate the fixed speed generators each at 800 kW and the variable speed generator at 400 kW.

If the load reduces from 2 MW to 1.8 MW, for example, then fixed speed generator 173 can be shut down, and fixed speed generator 172 run at its preferred load of 850 kW, with variable speed generator 132 run at a load of 950 kW. Alternatively, in some embodiments, it can be more efficient to run fixed speed generator 172 at a load of 900 kW and to run variable speed generator 132 at a load of 900 kW. In yet another alternative scenario, EMS 110 can shut down variable speed generator 132 and run both fixed speed generators at a load of 900 kW each.

A benefit of energy storage units 146 is that power generation system 200 can have less spinning reserve. Stored energy can be used, if needed, until system 200 brings another generator online. Power module 140 allows system 200 to operate as an uninterruptible power supply (UPS).

In some cases, system 200 can be used to recycle regenerated power for highly cyclical loads such as active heave winches. Overhauling load energy from AC bus 150 and DC bus 160 can be sent to energy storage units 146, and then re-used when the load(s) become motoring. For example, overhauling load energy from motor 162 can be sent to energy storage units 146 via DC-AC converter (inverter) 164, DC bus 160 and DC-DC converter 144. The overhauling load energy can then be re-used when the load becomes motoring.

In another example the load can increase from 1.8 MW to 2.2 MW when variable speed generator 132 is shut down (offline). The combined capacity of fixed speed generators 172 and 173 is only 2 MW which leaves a shortfall of 200 kW. EMS 110 can control system 100 such that the shortfall is supplied by stored energy from energy storage units 146 until another generator (either variable speed generator 132 or a third fixed speed generator not shown in FIG. 2) comes online.

Once variable speed generator 132 or the third fixed speed generator is online, fixed speed generators 172 and 173 can return to their preferred loading of 850 kW each.

In other embodiments, variable speed generator 132 of FIG. 1 can be omitted from power generation system 200, such that power generation is provided by fixed speed generators only.

Figure 3:
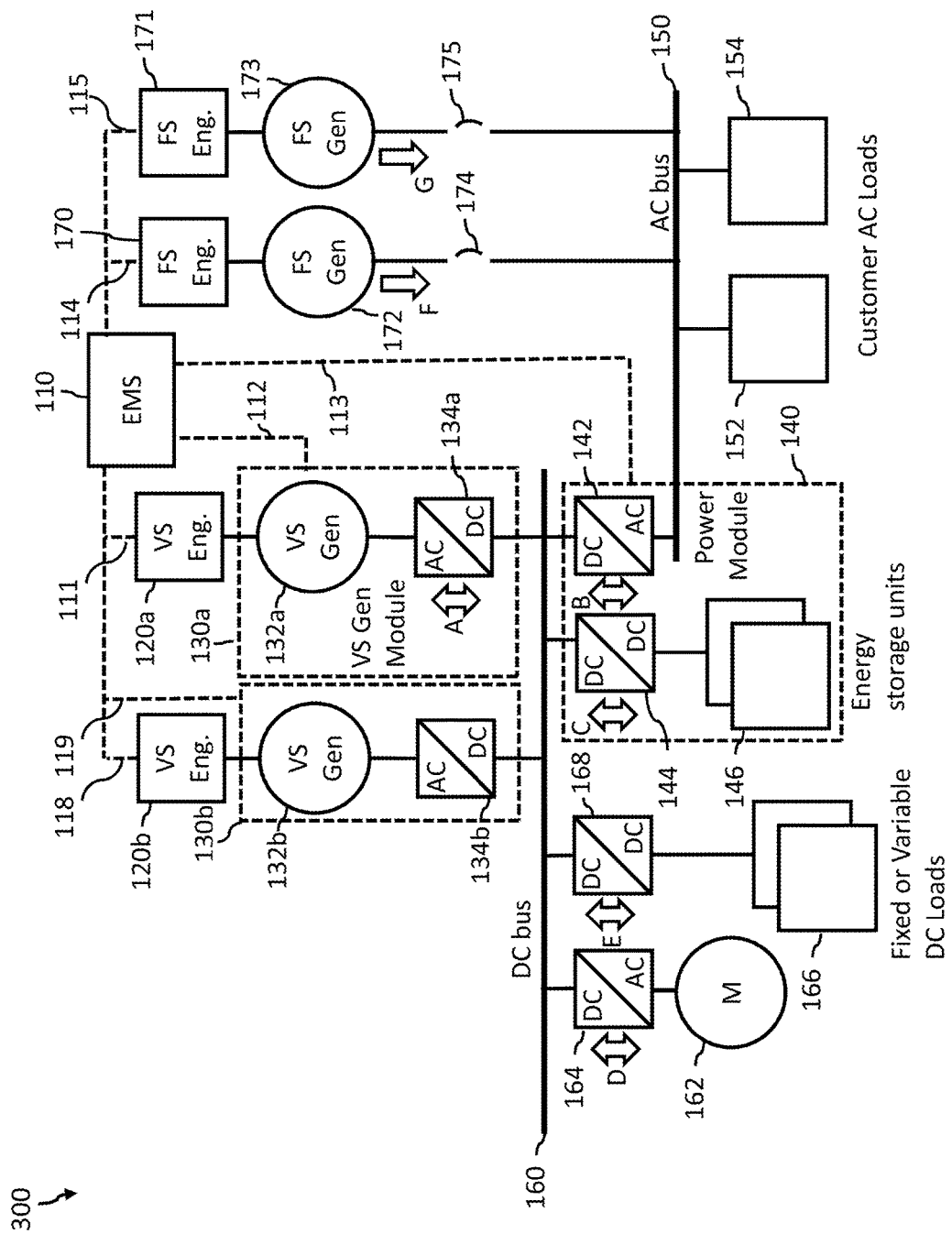
FIG. 3 is a block diagram of a power generation system according to a third illustrated embodiment.

FIG. 3 is a block diagram of power generation system 300, according to a third illustrated embodiment.

Power generation system 300 comprises the elements of power generation system 200. Variable speed engine 120, variable speed generation module 130, variable speed generator 132, and inverter 134 of FIG. 1, have been re-labeled 120a, 130a, 132a, and 134a, respectively. Power generation system 300 further comprises second variable speed engine 120b, second variable speed generation module 130b, second variable speed generator 132b, and second inverter 134b.

EMS 110 controls variable speed engine 120b and variable speed generation module 130b via interfaces 118 and 119, respectively.

EMS 110 can control system 300 such that the load is shared efficiently between variable speed generators 120a and 120b, as well as between the variable and fixed speed generators. Power module 140 can provide support for multiple variable speed generators and thereby minimize, or at least reduce, the loading on the fixed speed generators.

A benefit of power module 140 is that electrical generators on fixed speed generators 172 and 173 can be sized more modestly. For example, a 1 MW generator, conventionally sized to provide 1.25 MVA, can be fitted with a smaller electrical generator. It can also be used at close to unity power factor which reduces $I^2R$ losses in the windings and reduces field excitation losses, further improving efficiency of power generation system 300.

Power generation systems 100, 200, and 300 respectively support integration with optional renewable energy sources such as wind, water, and solar.

Figure 4:
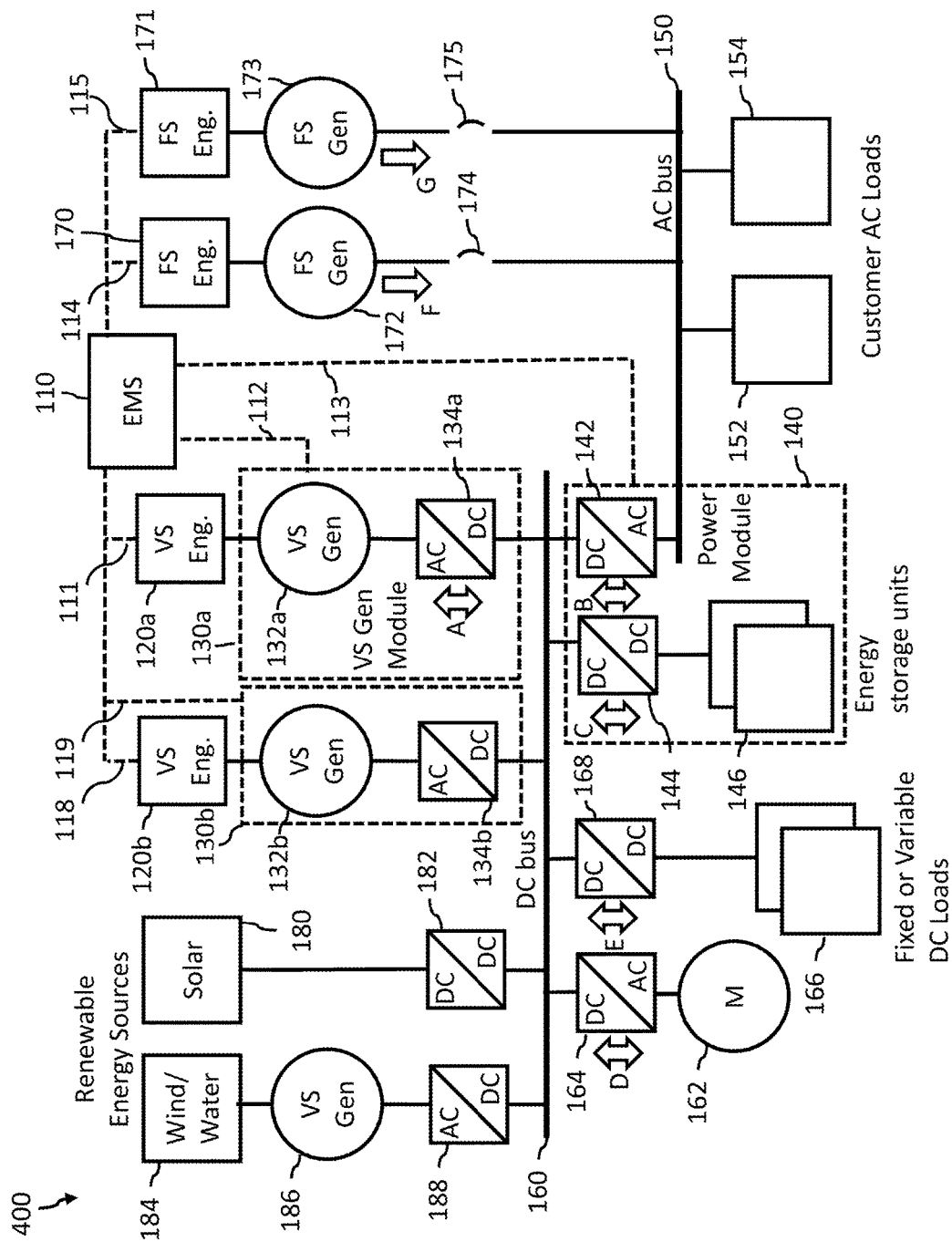
FIG. 4 is a block diagram of a power generation system according to a fourth illustrated embodiment.

FIG. 4 is a block diagram of power generation system 400, according to a fourth illustrated embodiment. Power generation system 400 comprises the elements of power generation system 300. Power generation system 400 further comprises solar or fuel cell energy source 180 and corresponding DC-DC converter 182 for supplying DC power to DC bus 160. Power generation system 400 further comprises wind/water or exhaust gas-driven turbine-generator 184 and corresponding variable speed generator 186 and AFE 188 for supplying DC power to DC bus 160.

Under the control of EMS 110, system 400 can supply power to energy storage units 146 from at least one of variable speed generator 132, fixed speed generators 172 and 173, AC bus 150 and renewable and/or alternative energy sources such as wind/water or exhaust gas-driven turbine-generator 184 and solar or fuel cell energy source 180.

Figure 5:
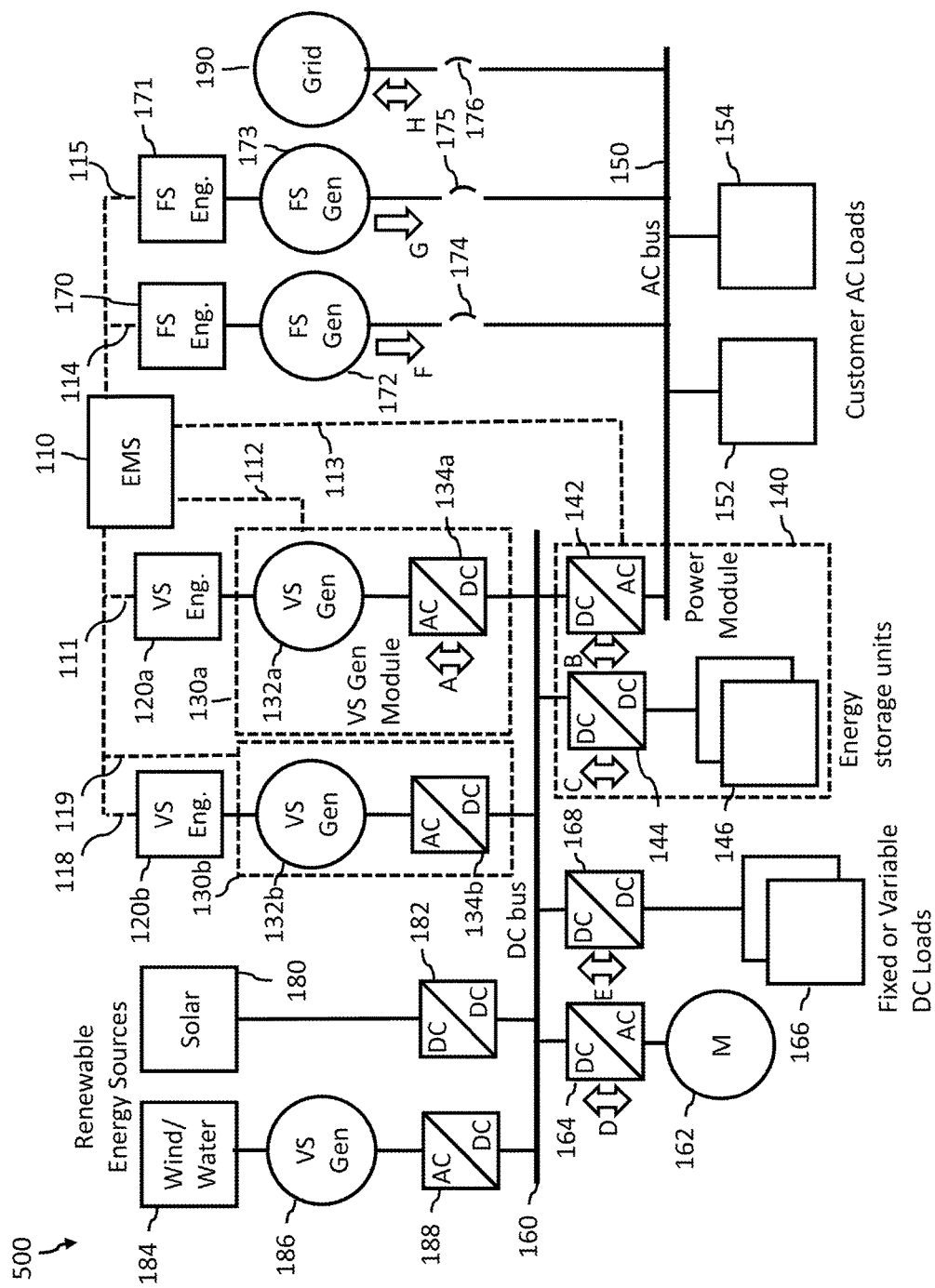
FIG. 5 is a block diagram of a power generation system according to a fifth illustrated embodiment.

FIG. 5 is a block diagram of power generation system 500, according to a fifth illustrated embodiment.

Power generation system 500 comprises the elements of power generation system 400. Power generation system 500 further comprises a connection of AC bus 150 to grid 190 via breaker 176. As indicated by arrow H, energy flows in both directions across the connection of AC bus 150 to grid 190. In some embodiments, grid 190 can supply energy to AC bus 150 and vice versa.

EMS 110 can monitor and manage the connection to grid 190. System 500 can operate in island mode, micro-grid mode and conventional AFE mode. In the latter mode, system 500 exports power to grid 190.

A benefit of system 500 is that it provides an opportunity for peak shaving. System 500 can adjust the amount of power drawn from grid 190, including, for example, supplementing power from grid 190 with power from other elements of system 500, such as variable and fixed speed generators, energy storage and renewable energy sources.

EMS 110 of systems 100-500 of FIGS. 1-5, respectively, executes at least one method for operating systems 100-500. The various methods can be chosen:
 a) to operate variable speed generator 120 (or generators 120a and 120b) for improved, or optimal, fuel efficiency;
 b) to respond to high step load changes by supplementing power via energy storage units 146;
 c) to reduce, or minimize, the use of stored energy by governing the rate at which supplemental energy is supplied during conditions in which the system is under transient load demand;
 d) to increase, or optimize, the rate of charging of energy storage units 146;
 e) to maintain improved, or optimal, loading on fixed speed generators 172 and 173; and/or
 f) to maintain high quality power on the AC Bus (for example, to reduce, or minimize, voltage deviation and frequency deviation during transient load conditions).

Figure 6A:
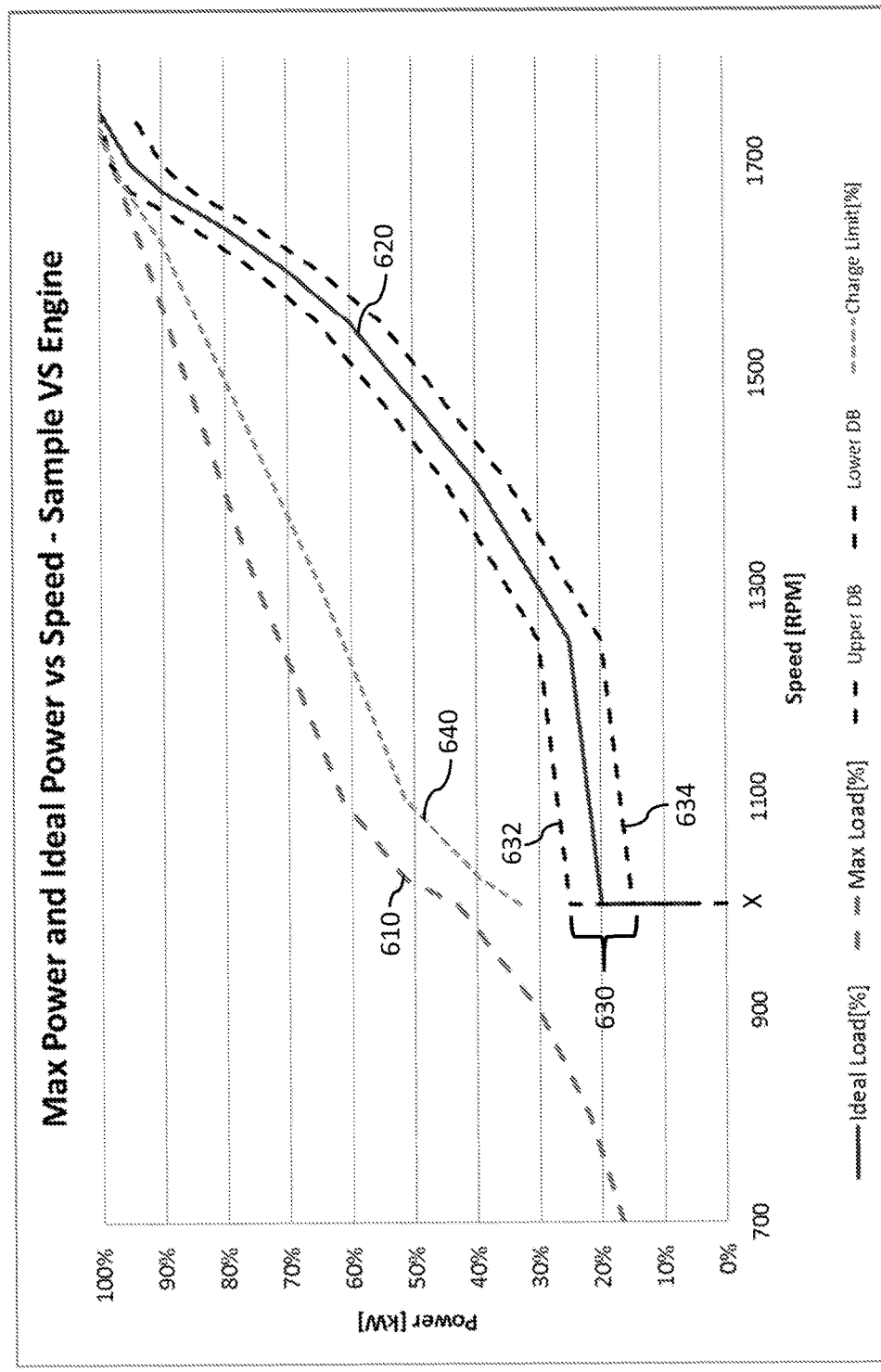
FIG. 6A is a graph showing power plotted against speed for an example variable speed engine, such as the variable speed engine of FIGS. 1-5.

FIG. 6A is a graph showing power plotted against speed for an example variable speed engine, such as variable speed engine 120 of FIGS. 1-5. Load curve 610 is a plot of load capacity against speed for a generator i.e. a plot of the maximum load at a given engine speed. Load curve 610 can be specific to an engine and provided by the engine's manufacturer. Ideal BSFC load curve 620 is a plot of the load at which the generator is most fuel-efficient for a given speed. In some embodiments, BSFC curve 620 is derived from the fuel map. In some embodiments, BSFC curve 620 is derived from testing.

Load curve 610 and BSFC curve 620 are inputs to EMS 110 and can be used in at least one method to obtain a preferred, or optimum, speed at which to run a variable speed generator given the present loading requirements of the system. The method can be selected to maintain a fuel-efficient speed in a variety of conditions while keeping the system stable.

The system tracks the present load relative to load curve 610 and BSFC curve 620. The system defines dead-band 630 on either side of ideal BSFC curve 620 within which changes in load do not trigger a change in speed of the variable speed generator. Dead-band 630 comprises upper bound 632 and lower bound 634. An advantage of dead-band 630 is to prevent, or at least reduce, a response by the system to small load changes. Another advantage of dead-band 630 is that the system can operate more efficiently without making frequent speed changes in response to small load changes.

When a load change occurs, and the load is outside dead-band 630, the system responds by determining a new speed for the variable speed generator. The system commands the generator to adjust its speed to the new speed. The response can be supplemented by discharging at least one of the energy storage units.

Figure 6B:
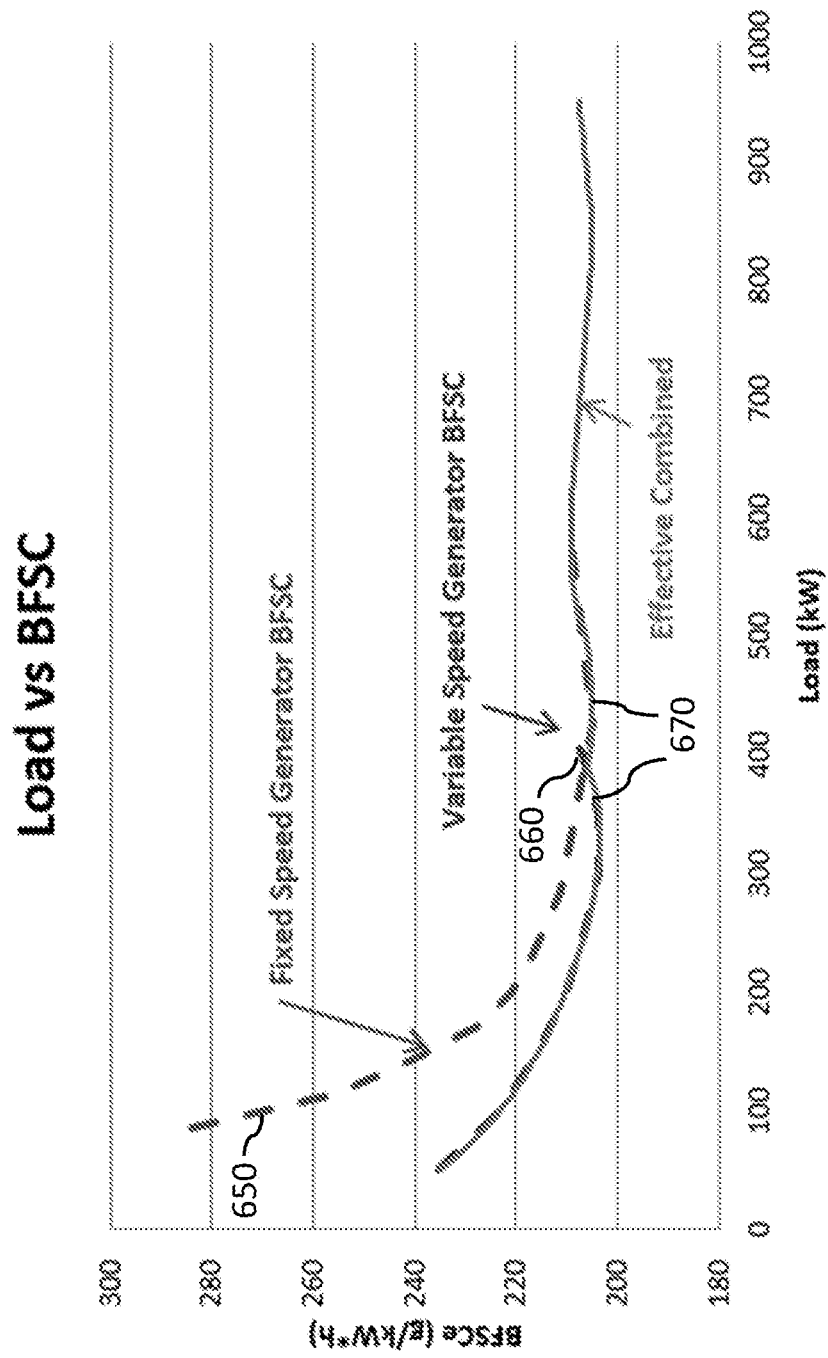
FIG. 6B is a graph showing Brake Specific Fuel Consumption (BSFC) plotted against load for an example embodiment of a hybrid power generation system such as the power generation system of FIG. 2.

FIG. 6B is a graph showing Brake Specific Fuel Consumption (BSFC) plotted against load for an example embodiment of a hybrid power generation system such as power generation system of 200 FIG. 2.

Curve 650 shows BSFC versus load for a fixed speed generator such as fixed speed generator 172 of FIG. 2. In the example shown in FIG. 6B, it can be desirable to maintain operation of the fixed speed generator at a load of about 400 kW to 600 kW. Curve 660 shows BSFC versus load for a variable speed generator such as variable speed generator 132 of FIG. 2. Curve 670 shows effective BSFC versus load for a combination of a fixed speed generator such as fixed speed generator 172 of FIG. 2 and a variable speed generator such as variable speed generator 132 of FIG. 2. FIG. 6B illustrates the lower fuel consumption over the range of loads for the hybrid power generation system such as power generation system 200 of FIG. 2.

Figure 7:
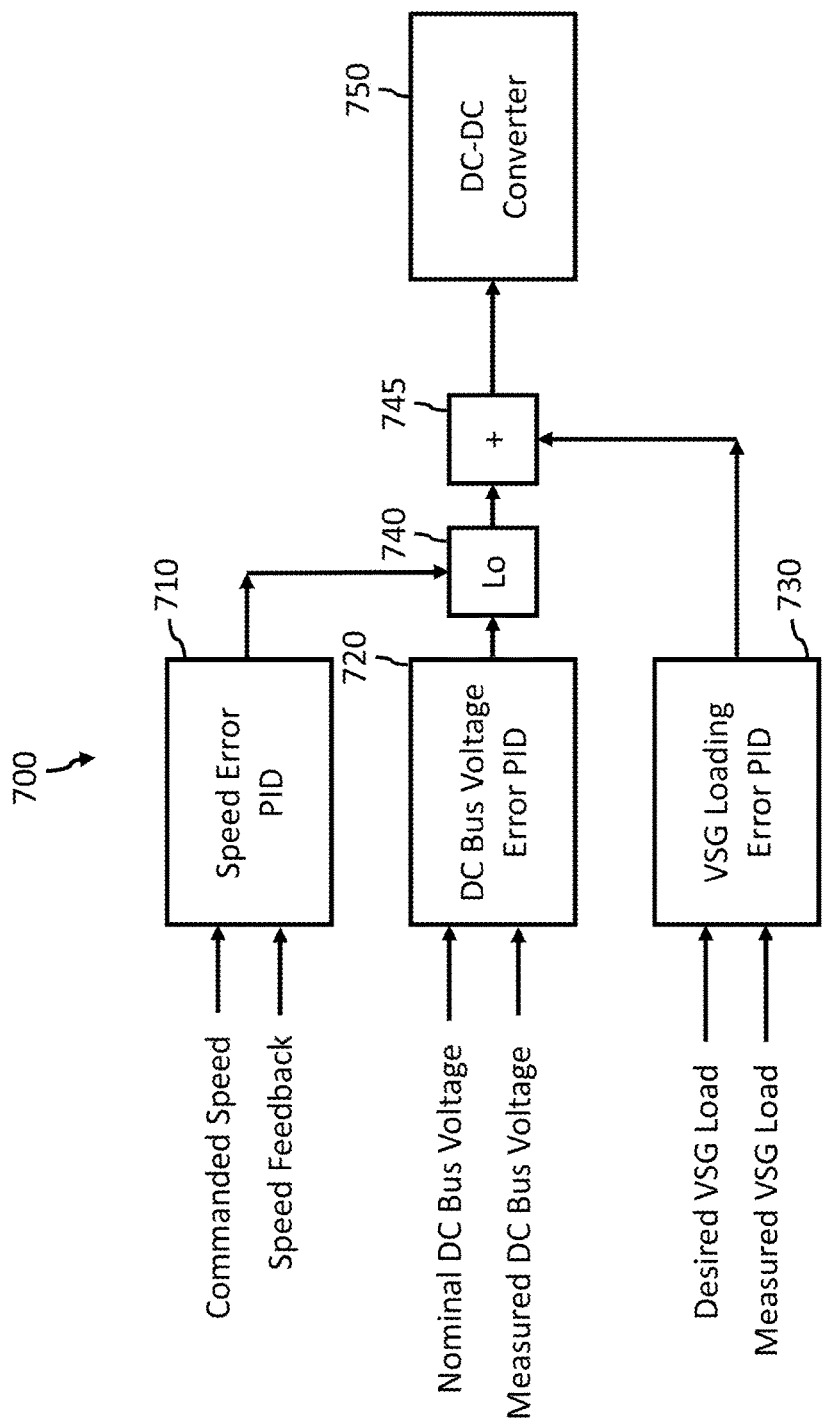
FIG. 7 is a schematic illustrating PID control of the discharge of an energy storage device, such as one of the energy storage units of FIGS. 1-5, during large step loads.
Figure 8:
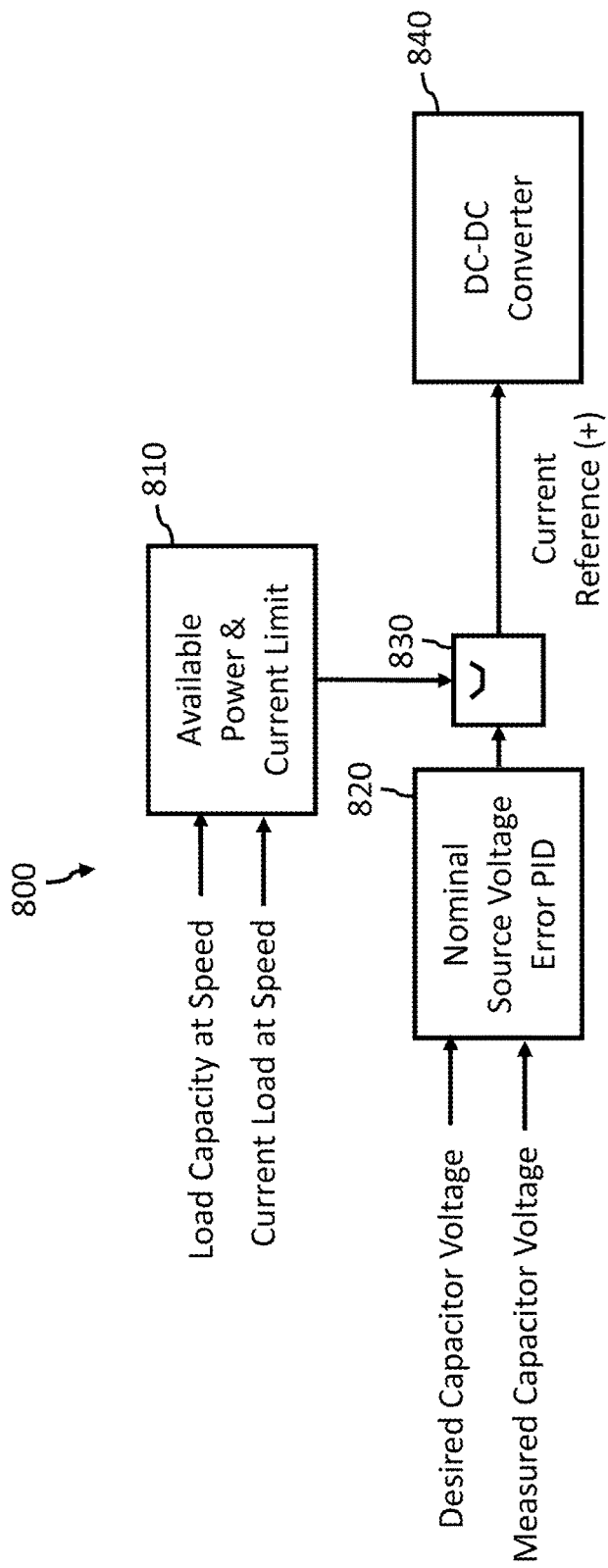
FIG. 8 is a schematic illustrating PID control of the charging of an energy storage device, such as one of the energy storage units of FIGS. 1-5.

FIG. 7 is a schematic illustrating PID control of the discharge of an energy storage device, such as one of energy storage units 146 of FIGS. 1-5, during large step loads.

When a large step load change occurs, a diesel engine, unable to respond immediately, will experience a drop in speed. If the drop in speed is too great, the diesel engine will stall. Speed error PID 710 monitors the drop in speed and uses a modified PID control method to generate a signal to module 740.

Speed error PID 710 can use unfiltered values for the input speed. Alternatively, the input values can be filtered. Since the input values can be noisy, it can be desirable to filter the values sufficiently to reduce noise without unduly affecting the ability of the system to respond to step load changes in a timely fashion. In at least one embodiment, a Savitsky-Golay filter is used to filter speed values. In other embodiments, other suitable filters can be used to reduce noise.

In response to the large step load change, the AC-DC converter, responsible for converting AC power into power for the DC bus, can have insufficient energy to maintain the DC bus voltage, resulting in a drop in DC bus voltage. DC bus voltage error PID 720 monitors the drop in DC bus voltage and uses a modified PID control method to generate a signal to module 740.

Module 740 selects the lower of the two input signals and passes it to adder 745. Since the signal is positive to charge and negative to discharge, the lower of the two input signals is the one that asks for the greater amount of power (i.e. the greater discharge from the energy storage units).

At adder 745, the signal is moderated by signal from variable speed generator (VSG) loading error PID 730. The method illustrated in FIG. 7 allows the system to respond quickly to the large step load change while maintaining sufficient load on the VSG to avoid, or at least reduce the likelihood of, over-discharging the energy storage units.

PID 730 receives a desired VSG load and a measured VSG load, and generates an error based on the difference between the desired and the measured VSG loads. PID 730 uses a modified PID control method to generate a signal sent to adder 745.

The system inputs the summed signal to DC-DC converter 750 attached to the energy storage units, and DC-DC converter 750 provides a determined amount of discharge in response to the step load change.

Once the energy storage units have depleted some of their charge, and the system is within dead-band 630 of ideal BSFC load curve 620 of FIG. 6, then the system re-charges the energy storage units. The charging is accomplished by increasing the load on the VSG without increasing the speed of the VSG. The system uses the margin between the BSFC curve and the load curve to increase VSG load without increasing speed.

Referring again to FIG. 6, the margin between load curve 610 and BSFC curve 620 becomes smaller as the speed increases, so, at higher speeds, the system has less capacity to charge the energy storage units. The system determines a current reference charge limit by first selecting a load value between load curve 610 and BSFC curve 620, and then translating the available load into a limiting value for the current reference. FIG. 6 shows available load curve 640. Determining and applying a current reference charge limit is particularly beneficial at higher loads and higher speeds.

FIG. 7 is a schematic illustrating PID control of the charging of an energy storage device, such as one of energy storage units 146 of FIGS. 1-5. In module 710, the system determines the available power for charging and the current reference limit. Nominal source voltage error PID 720 receives a desired capacitor voltage and a measured capacitor voltage, calculates an error, and uses a modified PID control method to determine the current reference. The current reference, in this case, is positive because the system is charging. The limited current reference is sent to the DC-DC converter at 740.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A power generation system comprising:
   (a) a variable speed generation module with a variable speed generator coupled to an AC-DC converter;

(b) a power module comprising:
  (i) an energy storage unit coupled to a DC-DC converter; and
  (ii) a DC-AC converter,
(c) an energy management system coupled to said variable speed generation module and said power module;
(d) a fixed speed generator;
(e) a DC bus wherein said variable speed generation module is coupled to said DC bus via said AC-DC converter, and said power module is coupled to said DC bus via said DC-DC converter and via said DC-AC converter;
(f) an AC bus wherein said fixed speed generator is coupled to said AC bus via a breaker, and said AC bus is coupled to said DC bus via said DC-AC converter of said power module, wherein said energy management system adjusts the electrical power output of said variable speed generator, said fixed speed generator, and said energy storage unit; and
(g) an alternative energy source coupled to said DC bus.

2. The power generation system of claim 1 wherein said power generation system supplies DC power to at least one of the group consisting of a fixed DC load, a variable DC load, a motor, and said DC-AC converter.

3. The power generation system of claim 1 wherein said power generation system supplies AC power to an AC load directly from said AC bus or via said DC-AC converter.

4. The power generation system of claim 1 wherein said energy management system load-shares among said variable speed generator, said fixed speed generator, and said energy storage unit.

5. The power generation system of claim 1 further comprising
(g) a renewable energy source coupled to said DC bus.

6. The power generation system of claim 5 wherein renewable energy source comprises at least one from the group consisting of a solar energy source, a wind turbine; and a water turbine.

7. The power generation system of claim 1 wherein the alternative energy source comprises at least one from the group consisting of a fuel cell and an exhaust gas-driven turbine-generator.

8. The power generation system of claim 1 further comprising:
(g) an interface to a utility grid, said interface coupled to said AC bus.

9. The power generation system of claim 1 wherein said energy storage unit comprises at least one from the group consisting of a capacitor, an ultra-capacitor, and a battery.

10. The power generation system of claim 1 wherein said variable speed generator is a permanent magnet generator.

11. The power generation system of claim 1 wherein said energy management system operates said power generation system in island mode.

12. The power generation system of claim 1 wherein said power generation system charges said energy storage unit.

13. A method for operating a power generation system to generate electrical power wherein said power generation system comprises:
(a) a variable speed generation module with a variable speed generator coupled to an AC-DC converter;
(b) a power module comprising:
  (i) an energy storage unit coupled to a DC-DC converter; and
  (ii) a DC-AC converter,
(c) an energy management system coupled to said variable speed generation module and said power module;
(d) a fixed speed generator;
(e) a DC bus wherein said variable speed generation module is coupled to said DC bus via said AC-DC converter, and said power module is coupled to said DC bus via said DC-DC converter and via said DC-AC converter; and
(f) an AC bus wherein said fixed speed generator is coupled to said AC bus via a breaker, and said AC bus is coupled to said DC bus via said DC-AC converter of said power module, wherein said energy management system adjusts the electrical power output of said variable speed generator, said fixed speed generator, and said energy storage unit; and
wherein said method comprises:
(a) adjusting a speed of said variable speed generator to increase the fuel efficiency of said power generation system; and
(b) adjusting the electrical power supplied by said energy storage unit in response to detecting a step load change, wherein adjusting the electrical power supplied by said energy storage unit includes:
  (i) monitoring a speed of said variable speed generator;
  (ii) monitoring a load on at least one of an AC bus and a DC bus;
  (iii) adjusting the speed of said at least one variable speed generator, based at least in part on said load; and
  (iv) governing the rate at which power is drawn from said energy storage unit, based at least in part on said load.

14. The method of claim 13 further comprising:
(c) receiving a speed error from said variable speed generator, said speed error based at least in part on a difference between a commanded speed and a speed feedback value;
(d) filtering said speed error to generate a filtered speed error;
(e) receiving a DC bus voltage error based at least in part on a difference between a nominal DC bus voltage and a received DC bus voltage;
(f) selecting a control parameter based at least in part on the lower of said filtered speed error and said DC bus voltage error;
(g) receiving a variable speed generator error based at least in part on a difference between a desired variable speed generator load and a received load;
(h) combining said control parameter and said variable speed generator error to generate a current reference; and
(i) discharging said energy storage unit of said power module based at least in part on said current reference.

15. The method of claim 14 further comprising:
(j) charging said energy storage unit after said discharging said energy storage unit, said charging comprising;
  (i) determining an available power for charging based at least in part on a difference between a preferred load capacity at the present speed of said variable speed generator and a received load;
  (ii) transforming said available power for charging into a current reference limit;
  (iii) receiving a nominal source voltage error based at least in part on a difference between a desired voltage for said energy storage unit and a received voltage;
  (iv) generating a current reference based at least in part on said nominal source voltage error and said current reference limit; and (v) charging said energy storage unit of said power module based at least in part on said current reference.

16. The method of claim 14 wherein filtering said speed error utilizes a Savitzky-Golay filter.

17. A power generation system comprising:
(a) a variable speed generation module with a variable speed generator coupled to an AC-DC converter;
(b) a power module comprising:
   (i) an energy storage unit coupled to a DC-DC converter; and
   (ii) a DC-AC converter,
(c) an energy management system coupled to said variable speed generation module and said power module, wherein said energy management system operates said power generation system in micro-grid mode;
(d) a fixed speed generator;
(e) a DC bus wherein said variable speed generation module is coupled to said DC bus via said AC-DC converter, and said power module is coupled to said DC bus via said DC-DC converter and via said DC-AC converter; and
(f) an AC bus wherein said fixed speed generator is coupled to said AC bus via a breaker, and said AC bus is coupled to said DC bus via said DC-AC converter of said power module, wherein said energy management system adjusts the electrical power output of said variable speed generator, said fixed speed generator, and said energy storage unit.

18. The power generation system of claim 17 wherein said power generation system supplies DC power to at least one of the group consisting of a fixed DC load, a variable DC load, a motor, and said DC-AC converter.

19. The power generation system of claim 17 wherein said power generation system supplies AC power to an AC load directly from said AC bus or via said DC-AC converter.

20. The power generation system of claim 17 wherein said energy management system load-shares among said variable speed generator, said fixed speed generator, and said energy storage unit.

* * * * *